US010025601B2

(12) United States Patent
Chang

(10) Patent No.: US 10,025,601 B2
(45) Date of Patent: Jul. 17, 2018

(54) SERVER CAPABLE OF SUPPORTING AND AUTOMATICALLY IDENTIFYING IP HARD DISK AND SATA HARD DISK

(71) Applicant: PORTWELL INC., New Taipei (TW)

(72) Inventor: Cheng-Han Chang, New Taipei (TW)

(73) Assignee: PORTWELL INC., New Taipei (TW)

( * ) Notice: Subject to any disclaimer, the term of this patent is extended or adjusted under 35 U.S.C. 154(b) by 96 days.

(21) Appl. No.: 15/362,029

(22) Filed: Nov. 28, 2016

(65) Prior Publication Data

US 2017/0322821 A1 Nov. 9, 2017

(30) Foreign Application Priority Data

May 6, 2016 (TW) ............................ 105206579 A

(51) Int. Cl.

*G06F 13/00* (2006.01)
*G06F 13/38* (2006.01)
*G06F 9/445* (2018.01)
*G06F 13/42* (2006.01)

(52) U.S. Cl.

CPC ...... *G06F 9/44505* (2013.01); *G06F 13/4282* (2013.01)

(58) Field of Classification Search

None

See application file for complete search history.

(56) References Cited

U.S. PATENT DOCUMENTS 7,155,546 B2 * 12/2006 Seto ...................... G06F 13/409 710/100
8,255,728 B2 8/2012 Liao
9,860,075 B1 * 1/2018 Gerszberg ........... H04L 12/2801
2013/0201316 A1 * 8/2013 Binder .................... H04L 67/12 348/77
2013/0306276 A1 * 11/2013 Duchesneau ......... G06F 9/5072 165/104.21
2013/0339486 A1 * 12/2013 Kulkarni ................. H04L 67/10 709/219
2015/0032837 A1 * 1/2015 Lei ........................ G06F 3/0607 709/212
2016/0328347 A1 * 11/2016 Worley ................. G06F 13/385

* cited by examiner

*Primary Examiner* — Michael Sun

(74) *Attorney, Agent, or Firm* — Muncy, Geissler, Olds & Lowe, P.C.

(57) ABSTRACT

A server capable of supporting and automatically identifying an IP hard disk and a SATA hard disk is operated under SDN. The server includes a machine body device. The machine body device is provided with a baseboard. The baseboard is electrically connected with electronic devices thereon. The electronic devices include an embedded controller IC on a back board; a multiplexer and a plurality of SoC modules on a load board; and a plurality of hard disks including at least one IP hard disk and one SATA hard disk. The embedded controller IC identifies each hard disk as the SATA hard disk or the IP hard disk according to a first potential signal of the telecommunication signal of the second pin of the signal terminals of each hard disk. The present invention meets the market for both IP hard disks and SATA hard disks and brings better economic benefits.

7 Claims, 4 Drawing Sheets

10 14 14 11 1 40 42 41 32 21 21 21 21 21 21 22 22 22 22

SERVER CAPABLE OF SUPPORTING AND AUTOMATICALLY IDENTIFYING IP HARD DISK AND SATA HARD DISK

The present invention relates to a server capable of supporting and automatically identifying an IP hard disk and a SATA hard disk for the user to select a hard disk interface on the same storage server, meeting the market for both IP hard disks and SATA hard disks.

BACKGROUND OF THE INVENTION

Nowadays, the network of SDN (Software-defined networking) has many advantages, so it is gradually used by enterprises and institutions. SDN is a network virtualization and uses Open Flow to separate the control plane of a router from the data plane, and is implemented with software. SDN allows a network administrator, without a change of the hardware, to replan the network by means of a program in a central control manner, so that the network can control paths automatically (automation). In the new control mode, a controller of a control layer is responsible for the network administration instead of the original, providing a method for controlling the network traffic and providing a core network and an innovative good network platform. However, this storage server under SDN only supports SATA hard disks or IP hard disks. The user is unable to choose a hard disk interface on the same storage server freely. This storage server cannot meet the demand of the user. Accordingly, the inventor of the present invention has devoted himself based on his many years of practical experiences to solve these problems and to develop a server capable of supporting and automatically identifying an IP hard disk and a SATA hard disk for the user to select a hard disk interface on the same storage server freely.

SUMMARY OF THE INVENTION

The primary object of the present invention is to provide a server capable of supporting and automatically identifying an IP hard disk and a SATA hard disk. The present invention meets the market for both IP hard disks and SATA hard disks and brings better economic benefits.

In order to achieve the above object, the server capable of supporting and automatically identifying an IP hard disk and a SATA hard disk of the present invention is operated under SDN (software-defined networking). The server comprises a machine body device. The machine body device is provided with a baseboard. The baseboard is electrically connected with electronic devices thereon. The electronic devices comprise at least one power supply, at least one first converter, and at least one load board. The power supply is electrically connected with each of the electronic devices inside the machine body device and supplies power to the electronic devices. The first converter is provided with a plurality of network ports. The first converter is connected with a network through the network ports. The load board is provided with a multiplexer, an embedded controller IC, and a plurality of SoC (System-on-Chip) modules thereon. The SoC modules are each inserted on a slot of the load board. The machine body device comprises a plurality of hard disks including at least one IP hard disk and one SATA hard disk. The IP hard disk and the SATA hard disk are fixedly disposed on at least one hard disk carrying board. The hard disk carrying board receives telecommunication signals of pins of signal terminals of the IP hard disk and the SATA hard disk and transmits the telecommunication signals to the multiplexer, the embedded controller IC, and the SoC modules on the load board. The telecommunication signals received by the multiplexer include the telecommunication signals from the SATA hard disk or from the IP hard disk. The SoC modules on the load board convert the received telecommunication signals of the pins of the SATA hard disk into telecommunication signals of the specification of the IP hard disk and transmit the telecommunication signals to the multiplexer of the load board. The embedded controller IC on the load board identifies each of the hard disks according to a first potential signal of the telecommunication signal of a second pin of the signal terminals of each hard disk of the telecommunication signals. Wherein, if the first potential signal of the hard disk is a constant high potential signal, the hard disk is identified as the SATA hard disk; if the first potential signal of the hard disk is a periodic switch of a high potential signal and a low potential signal, the hard disk is identified as the IP hard disk. The embedded controller IC on the load board sends a control signal to the multiplexer according to the aforesaid identification result for controlling the multiplexer to open an option, enabling the multiplexer to elect one of the telecommunication signals from the SATA hard disk or from the IP hard disk to be output to the first converter.

Preferably, the hard disk carrying board receives the telecommunication signals of the pins of the signal terminals of the IP hard disks and the SATA hard disks fixed thereon through a plurality of connectors each having a L-shaped configuration. Each connector has a hard disk terminal and a board terminal disposed at respective sides of the L-shaped configuration. The hard disk terminal is inserted in a first socket of the signal terminals of one of the IP hard disk and the SATA hard disk. The board terminal is inserted in the hard disk carrying board and electrically connected with a signal circuit of the hard disk carrying board so as to transmit the telecommunication signals of the hard disk carrying board and one of the IP hard disk and the SATA hard disk fixed on the hard disk carrying board to each other.

Preferably, the machine body device is provided with a plurality of fans.

Preferably, the SoC modules support two standard SATA interface devices including traditional hard disks or solid state disks.

Preferably, the SoC modules are a plurality of ARM Based SoC modules.

Preferably, the hard disk carrying board is provided with three hard disks including SATA hard disks or IP hard disks.

Preferably, the number of the at least one hard disk carrying board is four.

Advantages and features of the inventive concept and methods of accomplishing the same may be understood more readily by reference to the following detailed description of embodiments and the accompanying drawings.

DESCRIPTION OF THE PREFERRED EMBODIMENTS

Figure 1:
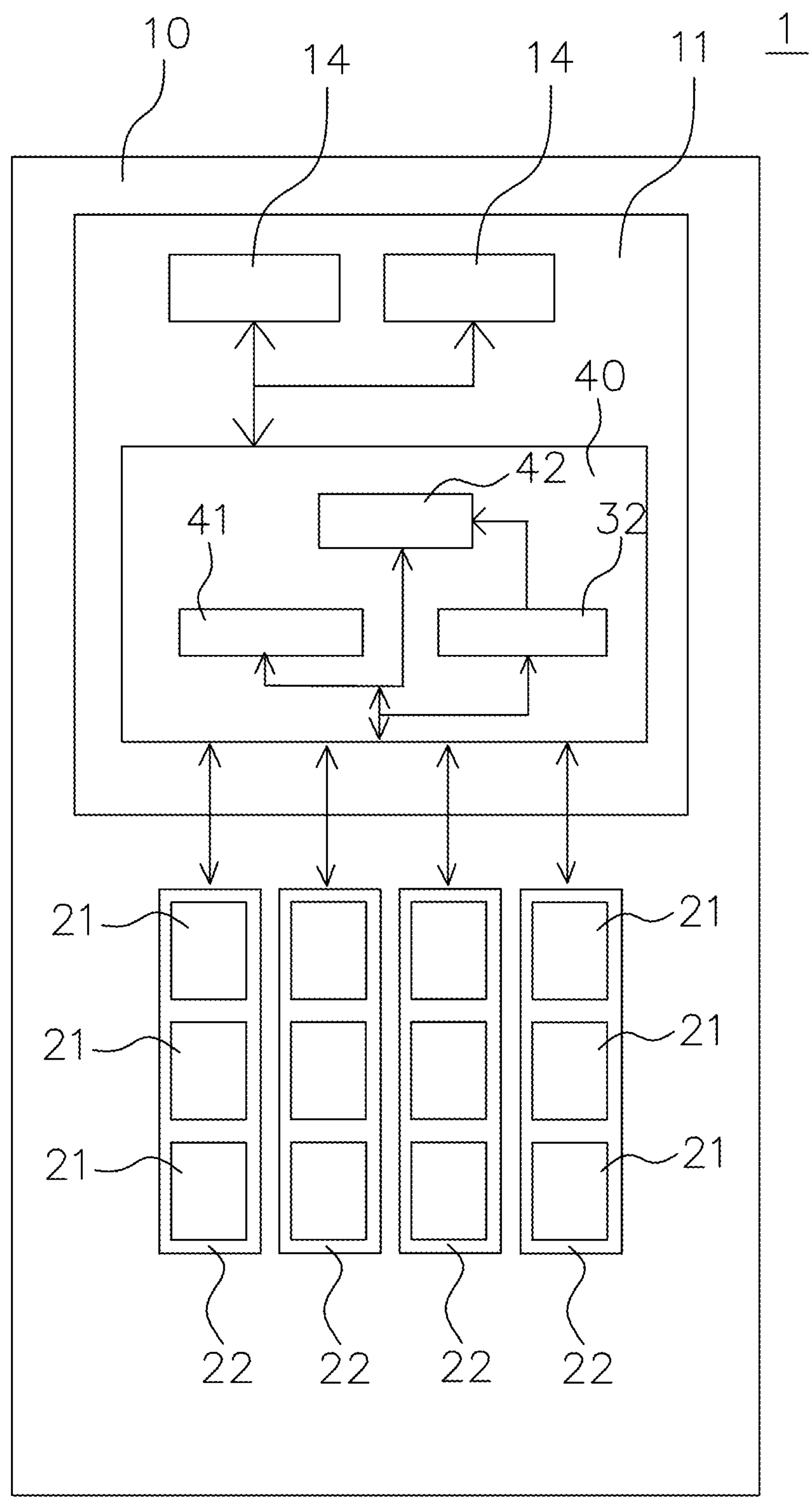
FIG. 1 is a structural diagram of the present invention.

Embodiments of the present invention will now be described, by way of example only, with reference to the accompanying drawings. In the drawings, the relative sizes of elements should not be construed as being limited to the proportion and arrangement relationship as shown in the drawings and may be exaggerated for clarity, without departing from the spirit and scope of the present invention.

Figure 2:
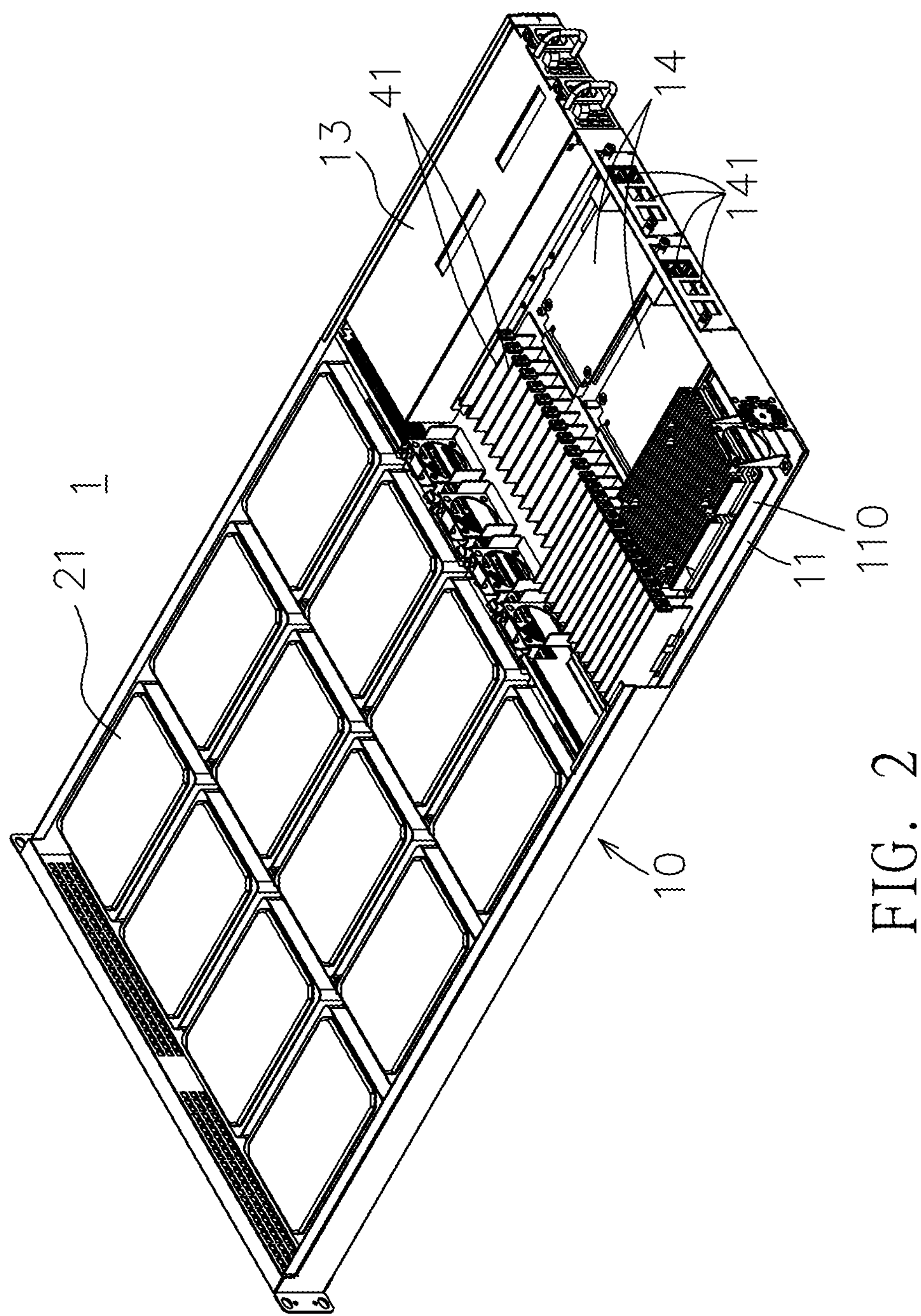
FIG. 2 is a schematic view of the present invention.

As shown in FIG. 1 and FIG. 2, the present invention discloses a server 1 capable of supporting and automatically identifying an IP hard disk and a SATA hard disk, which is operated under SDN. The server 1 comprises a machine body device 10. The machine body device 10 is provided with a baseboard 11. The baseboard 11 is electrically connected with electronic devices thereon. The electronic devices 10 comprise at least one power supply 13, at least one first converter 14, and at least one load board 40.

The power supply 13 is electrically connected with each of the electronic devices inside the machine body device 10 and supplies power to the electronic devices.

The first converter 14 is provided with a plurality of network ports 141. The first converter 14 is connected with a network through the network ports 141.

The load board 40 is provided with a multiplexer (MUX) 42, an embedded controller IC (EC) 32, and a plurality of SoC (System-on-Chip) modules 41 thereon. The SoC modules 41 are each inserted on a slot of the load board 40.

The machine body device 10 comprises a plurality of hard disks 21 including at least one IP hard disk and one SATA hard disk. The IP hard disk and the SATA hard disk are fixedly disposed on at least one hard disk carrying board 22. The hard disk carrying board 22 receives telecommunication signals of pins of signal terminals of the IP hard disk and the SATA hard disk and transmits the telecommunication signals to the multiplexer 42, the embedded controller IC 32, and the SoC modules 41 on the load board 40.

The telecommunication signals received by the multiplexer 42 include the telecommunication signals from the SATA hard disk or from the IP hard disk.

The SoC modules 41 on the load board 40 convert the received telecommunication signals of the pins of the SATA hard disk into telecommunication signals of IP hard disk specification and transmit the telecommunication signals to the multiplexer 42 of the load board 40.

The embedded controller IC 32 on the load board 40 is adapted to identify the hard disk according to a first potential signal of the telecommunication signal of the second pin of the signal terminals of each hard disk of the telecommunication signals. If the first potential signal of the hard disk is a constant high potential signal, the hard disk is identified as the SATA hard disk. If the first potential signal of the hard disk is a periodic switch of a high potential signal and a low potential signal, the hard disk is identified as the IP hard disk. The embedded controller IC 32 on the load board 40 sends a control signal to the multiplexer 42 according to the aforesaid identification result for controlling the multiplexer 42 to open an option, enabling the multiplexer 42 to elect one of the telecommunication signals from the SATA hard disk or from the IP hard disk to be output to the first converter 14.

Through the aforesaid structure, the present invention can support and automatically identify an IP hard disk and a SATA hard disk. The present invention can meet the market for both IP hard disks and SATA hard disks.

The SoC modules 41 are inserted on the respective slots of the load board 40. This embodiment has twelve SoC modules 41 for control and storage, but the number of the SoC modules 41 is not limited thereto. The SoC (System-on-Chip) module 41 is composed of hardware and software. The hardware comprises a controller, a microprocessor, a digital signal processor, and the like. The software is used to control the controller, the microprocessor, the digital signal processor and external apparatuses and interfaces. The SoC modules 41 can be applied to an embedded system to process digital signals, analogy signals, mixed signals and high-frequency signals. In the present invention, The SoC modules 41 convert the received telecommunication signals of the pins of the SATA hard disk into the telecommunication signals of IP hard disk specification and transmit the telecommunication signals to the multiplexer 42 of the load board 40. The plurality of SoC modules 41 may be a plurality of ARM Based SoC modules. The SoC modules support two standard SATA interface devices including traditional hard disks or solid state disks.

Figure 3:
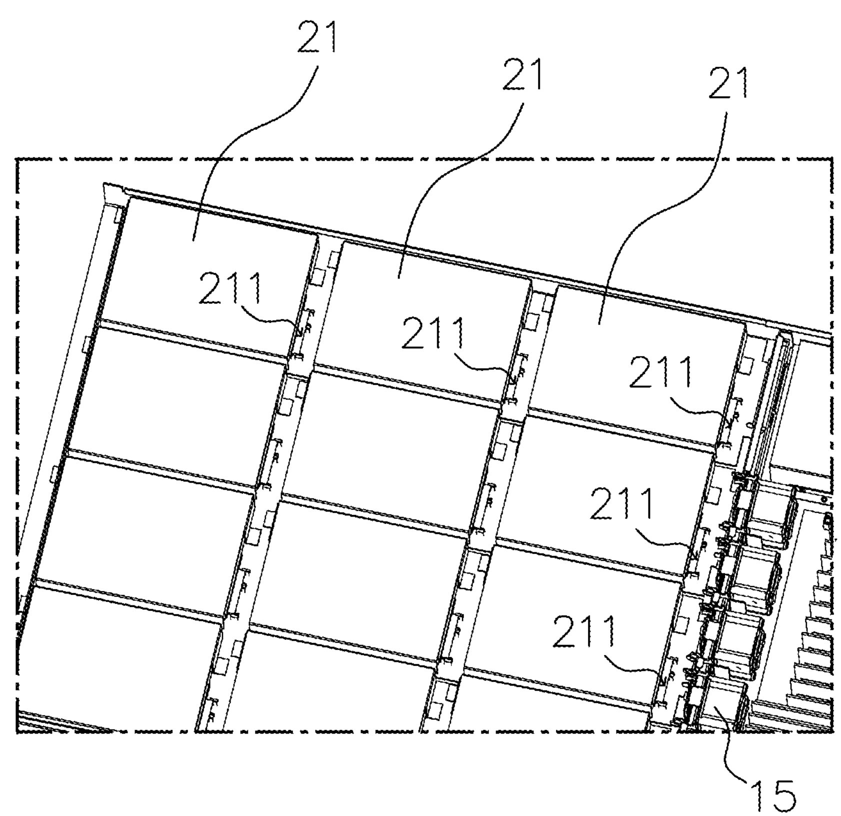
FIG. 3 is a first enlarged view showing the hard disk carrying board and the hard disks of the present invention.
Figure 4:
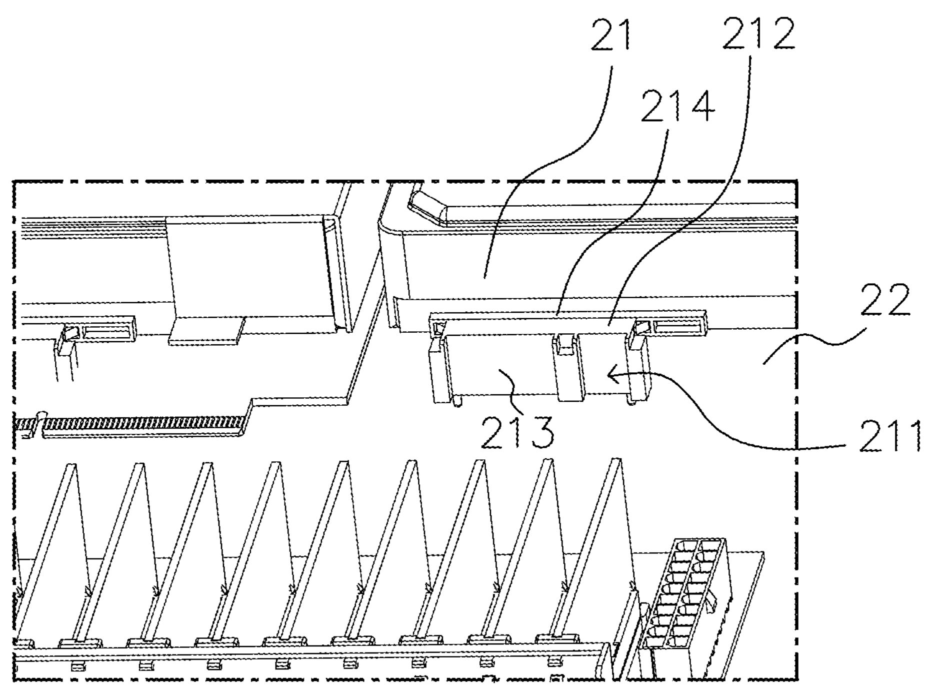
FIG. 4 is a second enlarged view showing the hard disk carrying board and the hard disks of the present invention.

Referring to FIG. 3 and FIG. 4, in the server 1 capable of supporting and automatically identifying an IP hard disk and a SATA hard disk of the present invention, the hard disk carrying board 22 receives the telecommunication signals of the pins of the signal terminals of the IP hard disk and the SATA hard disk fixed thereon through a plurality of connectors 211 each having a L-shaped configuration. Each connector 211 has a hard disk terminal 212 and a board terminal 213 disposed at respective sides of the L-shaped configuration. The hard disk terminal 212 is inserted in a first socket 214 of the signal terminals of one of the IP hard disk and the SATA hard disk. The board terminal 213 is inserted in the hard disk carrying board 22 and electrically connected with a signal circuit of the hard disk carrying board 22 so as to transmit the telecommunication signals of the hard disk carrying board 22 and one of the IP hard disk and the SATA hard disk fixed on the hard disk carrying board 22 to each other.

The machine body device 10 is provided with a plurality of fans 15, as shown in FIG. 3, to enhance heat dissipation.

Wherein, the number of the hard disks fixed on the hard disk carrying board 22 is not limited to the aforesaid embodiment. In the aforesaid embodiment, three hard disks are fixed on the hard disk carrying board 22. The three hard disks include SATA hard disks or IP hard disks.

Wherein, the number of the hard disk carrying boards 22 is not limited to the aforesaid embodiment. In the aforesaid embodiment, the number of the hard disk carrying boards 22 is four.

Accordingly, the server capable of supporting and automatically identifying an IP hard disk and a SATA hard disk of the present invention comprises a plurality of hard disks, at least one IP hard disk and one SATA hard disk. The embedded controller IC is used to identify the hard disk as a SATA hard disk or an IP hard disk according to a first potential signal of the telecommunication signal of the second pin of the signal terminals of each hard disk. Thereby, the present invention can support and automatically identify an IP hard disk and a SATA hard disk to meet the market for both IP hard disks and SATA hard disks. The present invention brings better economic benefits.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A server capable of supporting and automatically identifying an IP hard disk and a SATA hard disk, operated under SDN (software-defined networking), the server comprising a machine body device, the machine body device being provided with a baseboard, the baseboard being electrically connected with electronic devices thereon, the electronic devices comprising:

at least one power supply, the power supply being electrically connected with each of the electronic devices inside the machine body device and supplying power to the electronic devices;

at least one first converter, the first converter being provided with a plurality of network ports, the first converter being connected with a network through the network ports; and at least one load board, the load board being provided with a multiplexer, an embedded controller IC, and a plurality of SoC (System-on-Chip) modules thereon, the SoC modules being each inserted on a slot of the load board;

the machine body device comprising a plurality of hard disks including at least one IP hard disk and one SATA hard disk, the IP hard disk and the SATA hard disk being fixedly disposed on at least one hard disk carrying board, the hard disk carrying board receiving telecommunication signals of pins of signal terminals of the IP hard disk and the SATA hard disk and transmitting the telecommunication signals to the multiplexer, the embedded controller IC, and the SoC modules on the load board;

the telecommunication signals received by the multiplexer including the telecommunication signals from the SATA hard disk and or from the IP hard disk;

the SoC modules on the load board converting the received telecommunication signals of the pins of the SATA hard disk into telecommunication signals of IP hard disk specification and transmitting the telecommunication signals to the multiplexer of the load board;

the embedded controller IC on the load board identifying each of the hard disks according to a first potential signal of the telecommunication signals of a second pin of the signal terminals of each hard disk of the telecommunication signals, wherein if the first potential signal of the hard disk is a constant high potential signal, the hard disk is identified as the SATA hard disk; if the first potential signal of the hard disk is a periodic switch of a high potential signal and a low potential signal, the hard disk is identified as the IP hard disk; and the embedded controller IC on the load board sends a control signal to the multiplexer according to the aforesaid identification result for controlling the multiplexer to open an option, enabling the multiplexer to elect one of the telecommunication signals from the SATA hard disk or from the IP hard disk to be output to the first converter.

2. The server capable of supporting and automatically identifying an IP hard disk and a SATA hard disk as claimed in claim 1, wherein the hard disk carrying board receives the telecommunication signals of the pins of the signal terminals of the IP hard disks and the SATA hard disks fixed thereon through a plurality of connectors each having a L-shaped configuration, each connector has a hard disk terminal and a board terminal disposed at respective sides of the L-shaped configuration, the hard disk terminal is inserted in a first socket of the signal terminals of one of the IP hard disk and the SATA hard disk, the board terminal is inserted in the hard disk carrying board and electrically connected with a signal circuit of the hard disk carrying board so as to transmit the telecommunication signals of the hard disk carrying board and one of the IP hard disk and the SATA hard disk fixed on the hard disk carrying board to each other.

3. The server capable of supporting and automatically identifying an IP hard disk and a SATA hard disk as claimed in claim 1, wherein the machine body device is provided with a plurality of fans.

4. The server capable of supporting and automatically identifying an IP hard disk and a SATA hard disk as claimed in claim 1, wherein the SoC modules support two standard SATA interface devices including traditional hard disks or solid state disks.

5. The server capable of supporting and automatically identifying an IP hard disk and a SATA hard disk as claimed in claim 1, wherein the plurality of SoC modules are a plurality of ARM Based SoC modules.

6. The server capable of supporting and automatically identifying an IP hard disk and a SATA hard disk as claimed in claim 1, wherein the hard disk carrying board is provided with three hard disks including SATA hard disks or IP hard disks.

7. The server capable of supporting and automatically identifying an IP hard disk and a SATA hard disk as claimed in claim 1, wherein the number of the at least one hard disk carrying board is four.

* * * * *